United States Patent [19]

Hicks

[11] 3,938,556
[45] Feb. 17, 1976

[54] FAUCET

[76] Inventor: Glenn W. Hicks, 2749 N. 75th St., Milwaukee, Wis. 53210

[22] Filed: Dec. 12, 1973

[21] Appl. No.: 423,914

[52] U.S. Cl. .............................. 137/636.4; 137/607
[51] Int. Cl.² .......................................... F16K 11/18
[58] Field of Search ............ 137/625.17, 636.4, 607, 137/625.49, 636.1–636.3, 614.16, 614.17, 614.18; 4/192; 251/325

[56] References Cited
UNITED STATES PATENTS

| 613,041 | 10/1898 | Kamerer | 251/325 |
| 2,177,349 | 10/1939 | Corbin, Jr. | 137/636.4 |
| 2,766,774 | 10/1956 | Mornard | 137/636.3 |
| 3,190,309 | 6/1965 | Staat et al. | 137/636.4 |
| 3,437,112 | 4/1969 | Church | 137/636.3 |
| 3,828,821 | 8/1974 | Dotter | 137/636.4 |

FOREIGN PATENTS OR APPLICATIONS

| 799,188 | 8/1958 | United Kingdom | 137/607 |
| 1,195,882 | 6/1970 | United Kingdom | 137/637 |

Primary Examiner—William R. Cline
Assistant Examiner—H. J. Spiegel
Attorney, Agent, or Firm—Fred Wiviott

[57] ABSTRACT

A faucet of the type for controlling volume flow of fluids therethrough and for further controlling and varying the temperature of said fluids as determined by the operator of the faucet, for the purpose of effecting mixing of cold and hot water or cold and hot fluids whereby the resultant temperature may be selected from the temperature of the cold fluid supply to the temperature of the hot fluid supply or therebetween.

17 Claims, 5 Drawing Figures

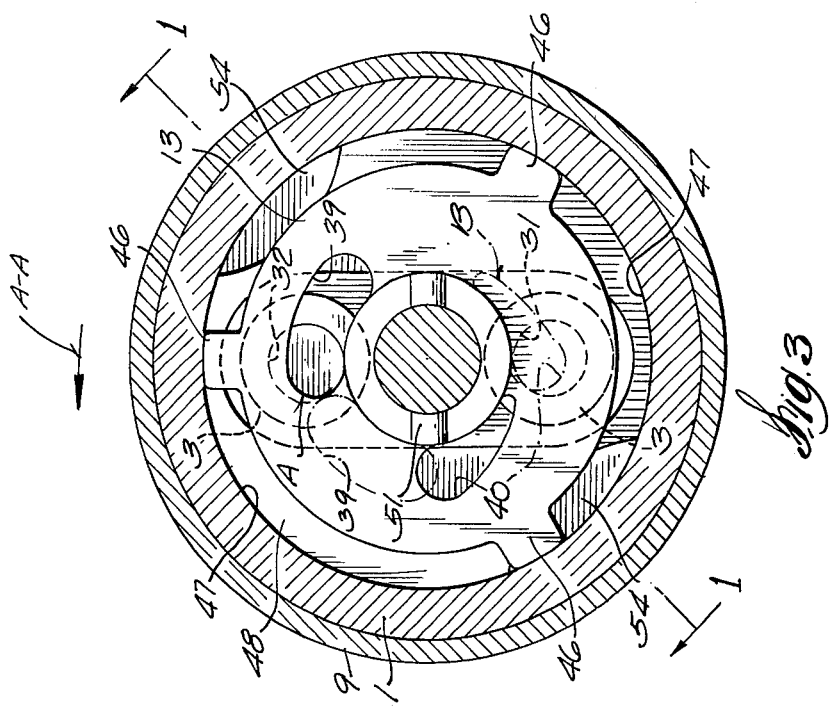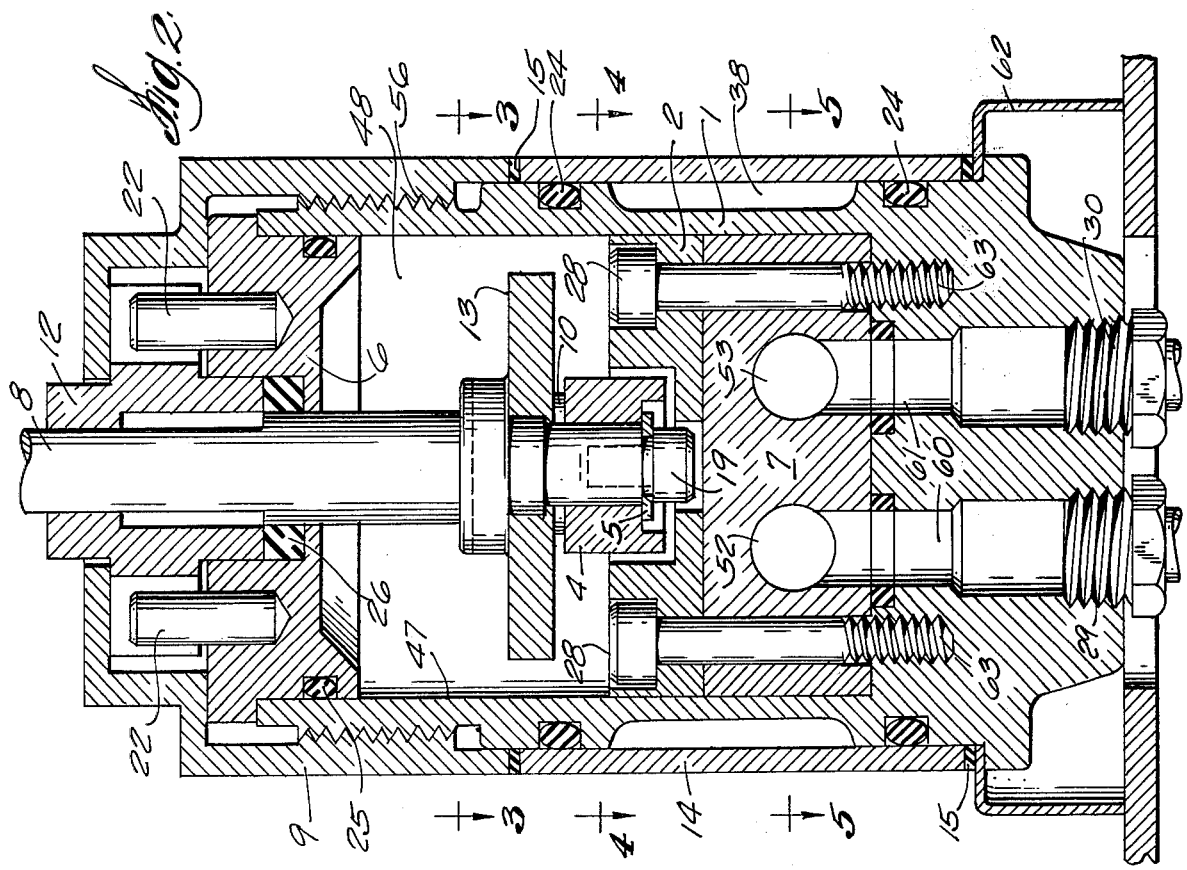

FAUCET

BACKGROUND OF INVENTION

The prior art relative to the field within which the present invention lies involves fluid flow and control faucet devices and such prior art discloses a trend toward construction of faucets having very simple design both as to use and also as to their maintenance; yet, manufacturers of these volume-type faucets continually seek an improved and more economical construction, and in addition further seek improvement of quality and durability. There are many types of such faucets; however, single-handle and regular faucet constructions such as those disclosed in patents issued to G. W. Hicks as U.S. Pat. Nos. 3,511,277 and 3,677,516 are of the type permitting economical and efficient manufacture. Various other patents are referred to in these issued patents. A dependable, economical, efficient single handle mixing faucet remains an article of demand within the plumbing industry. This present invention relates to an improved construction for such a mixing faucet. Durability, ease of manufacture, assembly and reliability of this device become important factors in the market place.

SUMMARY OF THE INVENTION

The present invention resides in providing a fluid control device which permits up and down motion of the faucet stem to regulate flow of fluid as to its volume from a closed position of the faucet to a maximum fluid flow position of the faucet and, by rotation of the faucet stem provides for the mixing of a cold fluid such as water from the regular cold water supply, together with the hot fluid provided from a heated fluid supply, and further provides for the flow of fluid through the faucet at its true cold or normal fluid temperature or at its full hot or heated fluid supply temperature. The disclosed faucet provides for fluid pressure balance within the faucet yielding a long life with extensive use and operation. As is the case with the faucet disclosed in U.S. Pat. No. 3,677,516 this faucet eliminates many problems which are present in existing faucets, such as changing washers, seating problems, etc.

DESCRIPTION OF THE DRAWINGS

FIG. 2 is a cross-sectional side view (partial) of the assembled faucet, taken at approximately 90° from the cross-sectional view position shown in FIG. 1; the faucet remains in its shut-off position;

FIG. 3 is a cross-sectional plan view taken on line 33 of FIG. 2;

Figure 1:
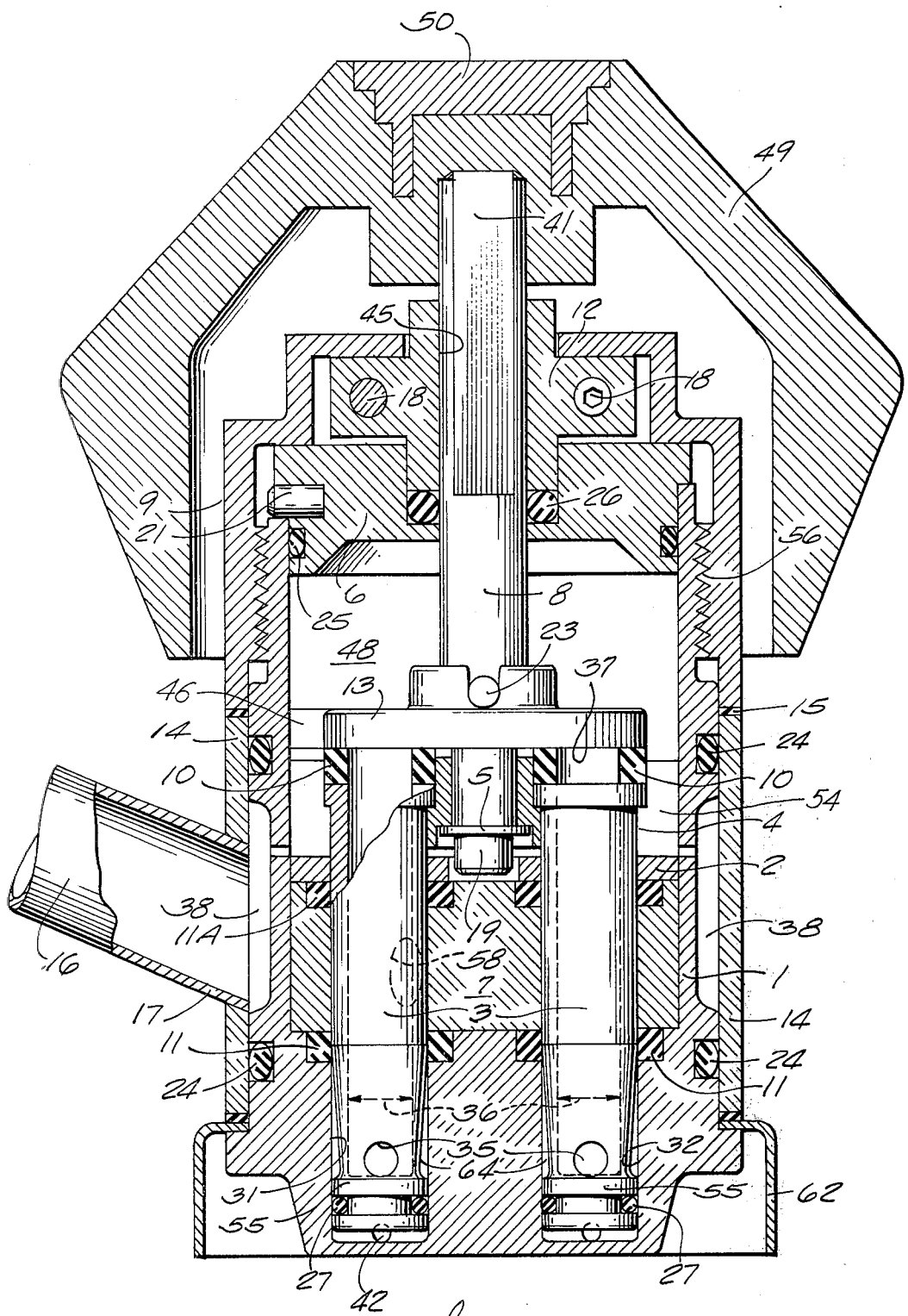
FIG. 1 is a cross-sectional side view of the faucet in its assembled position and having the faucet shut-off for no fluid flow.
Figure 4:
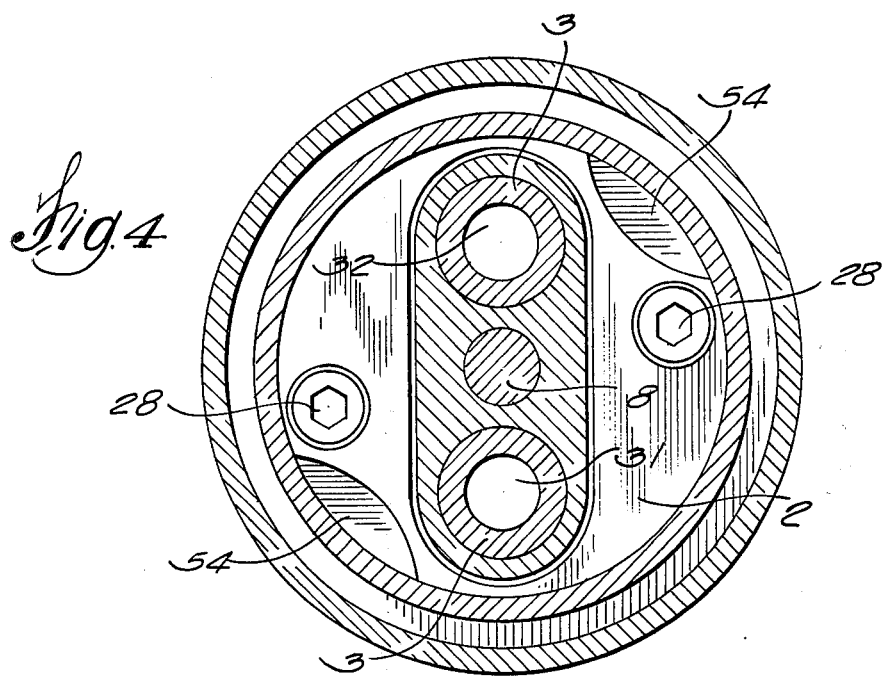
FIG. 4 is a cross-sectional plan view taken on line 44 of FIG. 2.

Referring to the drawings in detail, the faucet housing 1 formed of yellow brass or a non-absorbent plastic has a hollow chamber area which accommodates the spool cage 7. Juxtaposed atop said spool cage 7 and cooperative with same is cage retainer 2 screws 28, seated in the cage retainer 2, are threaded at 63 into accommodating threaded holes in the housing 1 to secure the spool cage 7 between the housing 1 and cage retainer 2.

The spool cage 7, housing 1 and cage retainer 2 have, slidably inserted therein a pair of valve spools 3; each valve spool 3 is cylindrical in shape and has a closed end which fits within the valve spool chamber 31 or 32. O-rings 27, encircling each valve spool 3, provides seal means between the lower end of the valve spool and the bottom of the spool chamber 31 or 32. The valve spool 3 is hollow from its top opening 37 to a point just above the O-rings 27. Also, at the point above O-rings 27, each valve spool 3 has a taper 64, also cylindrical in shape, as shown in the drawings which forms a spool flow chamber between the tapered cylindrical wall 64 of the valve spool and the cylindrical valve spool chamber 31. Valve spool seals 11 at the upper end of each spool flow chamber (when the faucet is in its closed position) and valve spool seals 11 A at the upper surface area of the spool cage 7 are spaced apart by the depth of spool cage 7. The channel 36 in each valve spool 3 opens at 37 (its upper end) for the flow of fluids as the faucet is operated.

A housing stop plug 6 has movably inserted therethrough valve stem 8. Pin 21 prevents rotation of the housing stop plug 6 with respect to the housing 1. O-ring 25 provides a seal between the inside of housing 1 and the housing stop plug 6. O-ring 26 provides a seal between the valve stem 8 and the housing stop plug 6 through which it passes. Attached to the lower end of the valve stem 8, in its assembled condition is the valve spool holder 4 and immediately above said valve spool holder 4 is the valve control plate 13. Valve seats 10, one for each valve spool 3, are between the lower flat surface of the valve control plate 13 and the top 37 of the valve spools 3. A washer 5, together with a screw 19, retain the valve spool holder 4 in a fixed relationship with the valve stem 8 (as to up and down motion) and yet permits rotation of the valve stem 8, together with valve control plate 13, simultaneously in the manner later described. Valve control plate 13, as shown in FIG. 3 has a cold water opening 39 therethrough and a hot water opening 40 therethrough. As shown, by position A in FIG. 3 the position of cold water opening 39 is aligned with valve spool chamber 32; hot water opening 40 in valve control plate 13 is not in alignment with valve spool chamber 31, thus preventing hot water flow, through said faucet because valve spool chamber 31 is closed by the bottom flat closed surface portion of the valve control plate 13 being seated against valve seat 10, a Teflon coated or formed seal. Valve spool holder 4 thus insures movement of the valve spools 3 simultaneously with movement, up and down, of the valve stem 8, and the valve spool holder 4 further permits rotational motion of the valve control plate 13 in unison with rotation of the valve stem 8.

Valve handle 49 is screwed or otherwise secured in a removable manner to valve stem 8 and a removable cap 50 covers the screw or securing means and also normally provides for abbreviated instructional information for the operation of the faucet.

Faucet valve stem 8 has a flat section along a part of its length at 41 which accommodates a similarly dimensioned hole 45 in valve limit arm 12. Adjustable set screws 18 are provided and project from the valve limit arm 12 and provide adjustable limits as to rotation of the vale stem 8, together with valve control plate 13, between the stops provided by pins 22 seated and fixed in housing stop plug 6. Adjustment of screws 18 permits setting the faucet for local hot and cold water temperatures.

The pin channels 51 formed in valve control plate 13 permit a snug relation between the valve control plate 13 and the valve seats 10 of each valve spool 3 when the pin 23 is inserted through valve stem 8. It is clear from the disclosure and description that as the handle 49 is raised or lowered, the entire valve stem 8, valve control plate 13, spool seals 10, valve spools 3, valve spool holder 4 simultaneously are raised or lowered; likewise, as handle 49 is rotated in either raised or lowered position of the stem 8 the valve control plate 13 rotates with the handle 49; however, the valve spool holder 4, and valve spools 3 remain in fixed position (relative to said rotation of the valve stem 8).

In the assembly of the faucet, spout body 14 encircles housing 1, and has gaskets 15 between the spout body 14 and the sink cover 62 and between the spout body 14 and the housing nut 9 threaded at 56 and which housing nut 9 becomes the final closure for the faucet. As shown in FIG. 2 the fluid flow inlet port 29 and inlet port 30 become threaded or otherwise connected to the pressurized fluid system. In the case of a water system, the water, with the faucet turned on for cold water would have the valve control plate 13, as in FIG. 3 position A, with cold water opening 39 in alignment with opening 37 of valve spool chamber 32, the water having flowed through the water inlet port 30, through inlet channel 61, subsequently through flow channel 59, into the chamber area formed by tapered valve spool section 64 and the wall of valve spool chamber 32. At that time, the handle 49 of the faucet has been raised a distance, thereby raising the valve spools 3, together with their piston-shaped ends 55 and openings 35 (of which there are three in each valve spool) to open valve spool chamber 31 and 32 to flow channels 58 and 59 through openings 52 and 53 respectively. Fluid enters the chamber provided between section 64 of the spool and the valve spool chamber walls. This permits cold water to flow upwardly within the channel 36 of the valve spool 3 past cold water opening 39 in the valve control plate 13 and into the mixing chamber 48, which because of upward movement of the stem 8 is now smaller in volume than that shown in FIG. 2 or FIG. 1. After flow progresses into mixing chamber 48 the water flows into the peripheral chamber 38 through the cut back sections 54 to fill the peripheral chamber 38 and then subsequent emission and flow through the spout 16 of spout assembly 17. O-rings 24, one upper and one lower relative to chamber section 38 as shown in FIG. 1, seal the spout assembly from leaks and because of gaskets 15 permit rotation of the spout assembly 17 relative to the faucet housing 1. In FIG. 2 and in FIG. 5 the openings into the valve spool chambers 31 and 32 are identified by numerals 53 and 52.

In the view of valve control plate 13, FIG. 3, the piece is formed with three spacers 46 which are integral with the valve control plate 13 and properly space and locate the member 13 within the housing chamber against the inner wall section 47 thereof; thus the valve control plate 13, through rotation of the handle 49 causes rotation of the valve control plate 13 with relation to the valve seats 10 and the housing 1 itself. Hot water opening 40 in valve control body plate 13 may be formed in a manner shown in FIG. 3, whereby the counterrotational movement of the handle 49 causes alignment on a gradual basis between the hot water opening 40 and the valve seat 10 or valve spool chamber 31 as in FIG. 3 which provides for flow of hot water. The handle 49 can then be rotated counterclockwise to a position shown as B in FIG. 3 whereby only hot water then flows up through the channel 36 of the valve spool 3 providing hot water flow through valve spool chamber 31 of FIG. 3. As such, the cold water is shut off and the hot water is fully on; obviously positioning the valve control plate 13 at various locations between full cold and full hot provides for a mixing of varying amounts of hot with cold fluid and thereby the mixing chamber areas 48 and 38 will receive both hot and cold, as provided, and emit a mixed temeratured fluid from the spout 16. Openings 52 and 53 of FIG. 2 are the openings provided to the valve spool chambers 31 and 32 from the fluid inlet ports 29 and 30.

Figure 5:
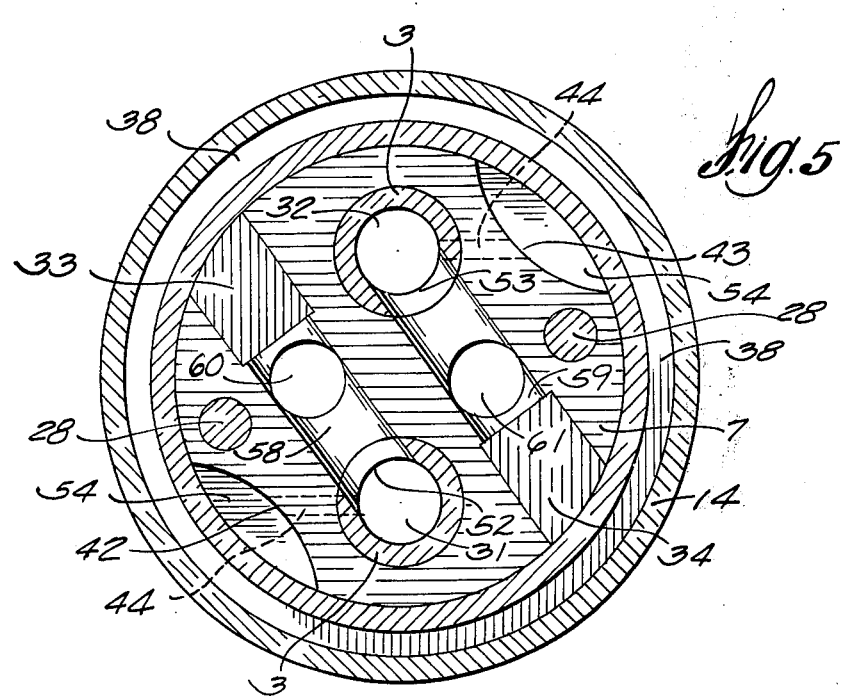
FIG. 5 is a cross-sectional plan view taken on line 55 of FIG. 2.

In the formation of spool cage 7 and the providing of flow channels 58 and 59 the subsequent necessity for plugs 33 and 34 becomes apparent; FIG. 5 shows the location of these plugs for directing fluid flow into the valve spool chambers 31 and 32 to the channels 36 of the valve spools 3. FIG. 2 shows the method by which screws 28 securely hold in position spool cage 7, cage retainer 2 with respect to the housing 1 of the faucet assembly. Seal means such as O-rings may be provided between housing 1 and the bottom surface of spool cage 7 to properly seal fluid flow through inlet ports 29 and 30.

Since fluids cannot be compressed, a provision must be made to permit escape and flow of fluid below the piston shaped ends 55 of the valve spools 3 as the handle action closes the fluid flow through the faucet. This is accomplished by providing weep holes 42, one in each valve spool chamber 31 and 32, which in turn connects through channels 44, shown in FIG. 5, to the cut back 54 chamber areas of the faucet. Inlet channels 60 and 61 shown in FIG. 2 and FIG. 5 are allinged channel portions of housing 1 and spool cage 7. The provision of the weep holes 42 and 43 provide for the pressure balance within the faucet when in operative position and also permit the downward motion of the handle 49, and in turn the seating of the valve spools 3 as shown in FIG. 1, to their closed or off position, with the greatest simplicity of effort. The seals 11 and 11 A, together with O-rings 27 and O-ring 26 cause frictional action during up and down action of the handle 49 to provide a positive setting in any up or down position or any positive position therebetween.

Positioning of housing Nut 9 properly, also with proper engineering design, provides for the exact compressing of valve seats 10 and seal means O-ring 26.

In operation, and in description of the various parts of the faucet it becomes obvious that up and down motion causes variation in volume flow through the faucet and rotation of the handle 49 to a proper position will provide for flow of all cold fluid, all hot fluid or any mixture of proportionate parts thereof inbetween these extremes. Also, it is clear that in the case of a residence use, after the user has found the general location of handle 49 to provide the proper degree of temperature mixture of hot and cold, subsequent operation of the faucet at other times merely requires up and down motion of the handle to provide varying degrees of volume flow. The further the valve spool 3 becomes positioned so as to have the taper portions 64 of the valve spool 3 upward of the lower valve spool seal 11 the greater volume flow of fluid. The faucet can be assembled such that the cold water fluid flow is always on as the handle 49 is lifted; thus the operation would go from a normally cold water flow as the handle is lifted and rotation of the handle in direction A—A of FIG. 3 would provide for progressive mixing of hot water with the cold water and subsequently after full rotation the hot water opening 40 is at position B of FIG. 3 and cold water opening 39 is closed.

In FIG. 5 of the drawings the openings 53 to the valve spools 3 into their open valve spool chambers 31 and 32 are shown with the valve spools in an upward and open position, showing that fluid through channels 60 and 61 enters the valve spool cahmbers 31 and 32 as previously described when the valve control plate 13 is positioned with respect to the valve seats 10 at the uppermost end of the valve spools 3.

The views in the drawings are approximately double scale, however they depict a form of the present invention. Obviously various materials in the plastics family may be used in the manufacture of the parts. Improvements in plastic materials such as Lexan and the like have permitted construction of the faucet almost entirely out of plastic.

Although but a single embodiment of the present invention has been illustrated and described, it will be apparent to those skilled in the art that various changes and modifications may be made therein without departing from the spirit of the invention or from the scope of the appended claims.

I claim:

1. A valve assembly comprising:
   a housing defining a mixing chamber,
   an outlet port formed in said housing and communicating with said mixing chamber,
   means defining at least two elongate chambers within said housing each of which is closed at one end and has an inlet port formed intermediate the ends thereof,
   hollow plug means slidably disposed within each said elongate chambers for movement between first and second positions, each said plug means having a first closed end, a second end open to siad mixing chamber and a lateral opening to its associated elongate chamber, each said plug means closing its chamber inlet port when in its first position and movement of each said plug to a second position resulting in gradual alignment of its lateral opening and its chamber inlet port to establish a flow path from said inlet port to said mixing chamber through said plug means,
   valve operating means for moving said plug means within said elongate chambers, and
   closing means rotatably engageable with the open ends of said plug means for selectively closing said open ends of said plug means to fluid flow.

2. The assembly set forth in claim 1 wherein said closing means comprises rotatable plate means engaging said open ends of said plug means and having a plurality of openings therethrough and oriented whereby rotation of said plate means causes said openings to be selectively aligned with said open plug ends.

3. The assembly set forth in claim 2 further comprising seal means intermediate said open plug ends and said closing means.

4. The assembly set forth in claim 1 wherein valve stem means engage said plug means and said closing means.

5. The assembly set forth in claim 4 wherein said closing means comprises plate means engaged by said valve stem means, said plate means engaging said open plug ends and having a plurality of openings therethrough whereby rotation of said valve stem means causes said plate means to rotate to selectively align said openings with said open plug ends, said stem means also comprising means engaging said plug means whereby longitudinal movement of said stem means causes movement of said plug means within said elongate chambers.

6. The assembly set forth in claim 5 wherein said elongate chambers are generally cylindrical and at least the ends of said plug means are also generally cylindrical and of substantially the same diameter as said elongate chamber means, each plug means including an intermediate portion of reduced diameter and said lateral openings in said plug interior being through said reduced diameter portions, and
   each said plug means closing its chamber inlet port when said plug means is in its first position and movement of said plug means to its second position causing said reduced diameter portion to align with its chamber inlet part to permit fluid flow therefrom to said plug interior through said lateral opening.

7. The assembly set forth in claim 6 wherein each said portion of reduced diameter is cylindrical and tapered from a diameter substantially equal to said elongate chamber diameter whereby movement of said plug means causes a gradual alignment of said chamber inlet port to fluid flow.

8. The assembly set forth in claim 7 wherein said plate means openings are arranged whereby when said plate means is in a first position one of said openings is fully aligned with the open end of one of said plugs and when in a second position another of said openings is fully aligned with the open end of another of said plugs and wherein during rotation of said plate means from said first to said second position said one plug end is gradually closed to fluid flow and said another plug end is gradually opened to fluid flow.

9. The assembly set forth in claim 8 further comprising resilient seal means intermediate said open plug ends and said plate means.

10. The assembly set forth in claim 1 further comprising fluid flow conduit means coupling the end of said elongate chambers and said mixing chamber.

11. The assembly set forth in claim 1 further comprising seal means for each of said plug means within said elongate chambers for preventing fluid flow to said mixing chamber other than through said plug means.

12. A mixing valve comprising:
   means defining a hollow housing,
   means within said housing defining a pair of cylindrical valve chambers closed at their lower ends and open at their upper ends to the interior of said housing, one of said chambers having a cold water inlet port formed intermediate the ends thereof and the other of said chambers having a hot water inlet port formed intermediate the ends thereof,
   hollow cylindrical valve spool means slidably disposed within each chamber, said spool means being closed at their lower ends and open at their upper ends to said housing interior and each having at least one lateral opening therethrough coupling its associated chamber with said spool means interior, each said spool means closing one of said water inlet ports to fluid flow when in a first lowered position and the lateral opening in each spool permitting flow through its associated port when said spool means is in a second raised position, rotatable body means disposed within said housing for selectively opening and closing said open ends of said spool means to fluid flow, means engaging said spool means for moving said spool means from said first to said second position; and outlet port formed in said housing.

13. The invention set forth in claim 12 wherein said body means includes first and second spaced apart openings constructed and arranged whereby when in a first position a first one of said openings is in registry with the open end of one valve spool means and when in a second position the second one of said openings is in registry with the open end of said other valve spool means and wherein during rotation of said body means from said first to said second position said body member gradually closes said one valve spool means opening to fluid flow and gradually opens said other valve spool means opening to fluid flow.

14. The invention set forth in claim 13 further comprising stem means engaging both said body means and said valve spool means.

15. The invention set forth in claim 14 and assembly further including seal means for preventing fluid flow from said chamber inlet ports to said housing interior other than through said lateral openings, the interiors of said spool means, and said openings in said body means.

16. The invention set forth in claim 15 wherein each said spool means includes an intermediate portion of gradually diminishing diameter whereby a fluid chamber is formed between the intermediate portions of said spool means and said chamber means, each said lateral opening is located at such portion, the dimensions of said fluid chamber gradually increasing as said spool means are raised from their first to their second positions.

17. The invention set forth in claim 16 wherein conduit means couple the closed end of said elongate valve chambers to said housing interior.

* * * * *

UNITED STATES PATENT OFFICE
CERTIFICATE OF CORRECTION

Patent No. 3,938,556  Dated February 17, 1976

Inventor(s) Glenn W. Hicks

It is certified that error appears in the above-identified patent and that said Letters Patent are hereby corrected as shown below:

Column 5, Claim 1, line 38, change "siad" to --said--.

Column 6, Claim 6, line 11, after "each" insert --said--.

Column 8, Claim 15, line 4, after "and" delete "assembly".

Signed and Sealed this

*twenty-ninth* Day of *June 1976*

[SEAL]

*Attest:*

RUTH C. MASON
*Attesting Officer*

C. MARSHALL DANN
*Commissioner of Patents and Trademarks*